March 22, 1938.  J. H. DILLON ET AL  2,112,190

METHOD OF TESTING PLASTICITY

Filed Dec. 14, 1933

INVENTORS
JOHN H. DILLON
AND
NORRIS JOHNSTON
BY
Ely & Barrow
ATTORNEYS

Patented Mar. 22, 1938

2,112,190

UNITED STATES PATENT OFFICE 2,112,190

METHOD OF TESTING PLASTICITY

John H. Dillon, Akron, and Norris Johnston, Cuyahoga Falls, Ohio, assignors to The Firestone Tire & Rubber Company, Akron, Ohio, a corporation of Ohio Application December 14, 1933, Serial No. 702,336

5 Claims. (Cl. 265—11)

This invention relates to methods of testing the plasticity of plastic materials, and more especially it relates to improvements in the methods of testing plasticity by extruding the plastic material.

The invention is of primary utility in the controlling of plasticity in production stocks and to aid in developing new stocks which may be extruded satisfactorily. It has been found that plasticity tests heretofore made, both by the compression and the extrusion methods, fail to correlate with factory extrusion machines, due in large part to the fact that said methods employ much lower rates of shear than obtains in the usual existing extrusion machines.

The chief object of the invention is to obtain a method of plasticity testing that will give accurate results, and which results correlate with factory extrusion methods. Other objects will be manifest.

Briefly stated, the invention consists in determining the rate of extrusion for a given pressure and temperature through an orifice of determinate size and shape. From these results it is possible to obtain the rate of shear, which may be considered a criterion of flow conditions suitable for comparative purposes. The results also may be used for determining the two quantities necessary to define the plastic state of a material, namely, the mobility and the yield stress.

Apparatus for the practice of applicants' invention is shown in the accompanying drawing of which:

Figure 1:
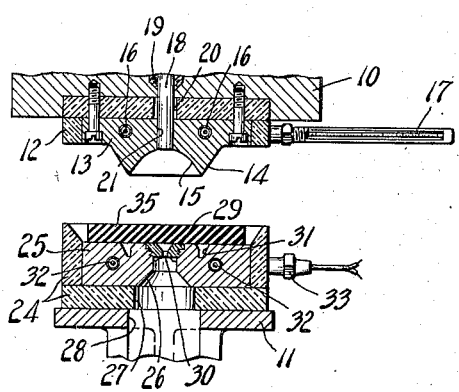
Figure 1 is a central vertical section of apparatus adapted to carry out the invention in inoperative position, and a test piece of plastic rubber composition therein.

Referring to the drawing, 10 is a stationary platen and 11 is the vertically movable platen of a suitable power press. Mounted upon the bottom of the stationary platen 10 is a box-like heat-insulating jacket 12 of bakelite or the like, and mounted in said jacket is an upper die 13 that is formed with a downwardly extending annular flange 14 defining a cup-shaped concavity 15. The die member 13 is heated to a determinate temperature by electric heating elements 16, 16 mounted therein, and a thermometer 17 may be provided for indicating said temperature. A vertical, reciprocable plunger 18 extends through a stuffing box 19 in the upper platen 10 and through an aperture 20 in the jacket 12, the lower end portion of said plunger being sildably mounted in an aperture 21 in the die member 13. The plunger is coaxial with relation to cavity 15, and its lower end is flush with the surface of said cavity. Vent ducts 22 extending from aperture 20 to the atmosphere are formed in the jacket 12.

Mounted upon the top of the movable, lower platen 11 is an insulating jacket 24, and mounted in said jacket is a die block 25. The latter is formed with a central aperture 26 that is aligned with a central aperture 27 in the jacket 24 and a somewhat larger aperture 28 in the platen 11. Threaded into aperture 26 in the die block 25 is a die 29 formed with an extrusion orifice 30, the upper end of which is tapered, flared, or countersunk at an angle of 45°. The upper face of the die block is formed with an annular groove 31 that is concentric with the axis of die orifice 30, the inner edge of said groove being formed with a bevel or chamfer as shown. The groove 31 also is concentric with the flange 14 of the upper die 13, the arrangement being such that when the lower platen 11 is in elevated, operative position, the inner surface of the flange 14, at the lower edge thereof, will engage the beveled surface at the inner edge of groove 31 with a sealing fit. The die block 25 is heated to determinate temperature by electric heating elements 32 mounted therein, and a thermostatic control, of which only the member 33 is shown, is provided for keeping the said die block at constant uniform temperature.

Figure 2:
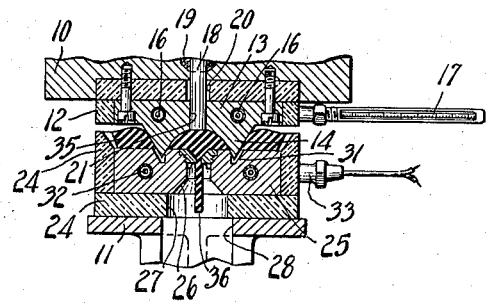
Figure 2 is a section of the apparatus shown in Figure 1, in the initial phase of operation.

In the practice of the invention, test pieces 35 of unvulcanized rubber composition 35 are prepared by preheating them for a suitable length of time, after which one of them is mounted upon the die holder 25 as shown in Figure 1. The lower platen 11 is then elevated to the operative position shown in Figure 2, with the result that the die holder 25 is moved into engagement with the upper die 13. Thus a local region of the test piece 35 is sheared therefrom and concurrently confined in the cavity 15 of the upper die 13, the excess of rubber in the cavity being forced through the orifice 30 of the die 29 in the form of an elongate cylindrical cord 36.

Figure 3:
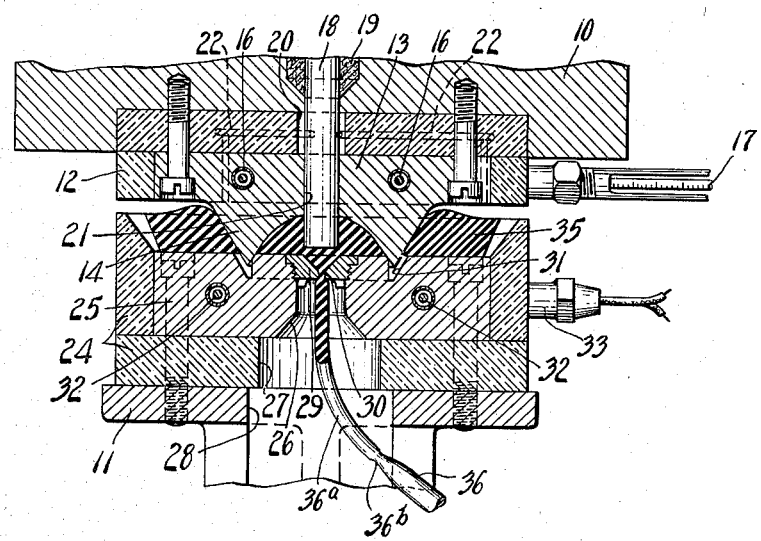
Figure 3 is a view similar to Figures 1 and 2, on a larger scale, showing the apparatus in the final phase of operation.

Air entrapped in the cavity 15 or occluded in the rubber escapes through orifice 20 and along the plunger 18, passing out through the ducts 22. The apparatus is allowed to remain in the position shown in Figure 3 for several minutes to allow the test piece confined in the cavity 15 to attain the proper temperature. The plunger 18 is then moved downwardly to effect extrusion of the confined test piece through the die 29. The rubber thus extruded is designated 36a and is distinguishable from the previously extruded piece 36 by a line of demarcation 36b. There is a determinate limit to the downward movement of the plunger 18, and the time required for the plunger to reach said limit is carefully ascertained, preferably by automatic timing mechanism (not shown). The extruded piece 36a is severed and measured before cooling, the measurement of length giving an inverse measure of the amount of recovery. The residual elasticity in the stock causes the extruded rubber strip 85a to expand in diameter upon emergence from the orifice. Since the volume of rubber is constant the measurement of length gives an inverse measure of diameter and consequently of elastic recovery. This completes the test and the platens may be separated and the remainder of the test piece in the apparatus removed.

Modification may be resorted to without departing from the spirit of the invention or the scope of the appended claims, which are not limited wholly to the exact procedure described.

What is claimed is:

1. The method of testing plasticity which comprises preparing a test piece of plastic material of determinate size by confining and compressing a piece of material of larger size and extruding the surplus material therefrom, and then displacing a determinate portion of the interior of the test piece by extruding it in the form of a strip of determinate cross-section.

2. A method as defined in claim 1 including the step of determining the time required to effect displacement of the material with determinate pressure.

3. A method as defined in claim 1 including the step of heating the test piece while it is confined.

4. The method of testing plasticity which comprises preparing a test piece of plastic material of determinate size by confining and compressing a piece of material of larger size in a manner that extrudes the surplus material therefrom, heating the confined material, displacing a determinate portion of the interior of the test piece by extruding it in the form of a strip of determinate cross section, and determining the time required to effect said displacement.

5. The method of testing plasticity which comprises shearing a quantity of plastic material from a larger size mass thereof and concurrently confining and compressing the sheared-off piece to bring it to determinate size by extruding surplus material therefrom, extruding a determinate portion of said material, and determining the time required to effect the latter extrusion.

JOHN H. DILLON.
NORRIS JOHNSTON.